United States Patent [19]

Hörler et al.

[11] 4,116,502

[45] Sep. 26, 1978

[54] DUAL BEARING STRUCTURE FOR ROTATABLE MACHINE PARTS WITH ANTIFRICTION AND PLAIN BEARINGS

[75] Inventors: Hansulrich Hörler; Ulrich Linsi, both of Zurich; Oswald Policke, Fislisbach, all of Switzerland

[73] Assignee: BBC Brown, Boveri & Company Limited, Baden, Switzerland

[21] Appl. No.: 800,014

[22] Filed: May 24, 1977

[30] Foreign Application Priority Data

Jun. 3, 1976 [CH] Switzerland ............... 7002/76

[51] Int. Cl.² .................................... F16C 32/00
[52] U.S. Cl. .................................... 308/9; 308/35; 308/187; 308/189 R; 308/219; 415/111; 417/407
[58] Field of Search ................ 308/219, 187, 35, 174, 308/189, DIG. 15, 9, 227, 121–122, DIG. 5, DIG. 8, DIG. 9, 238, 184, 175, 240, 176, 196; 417/407; 415/110–111; 184/6.11

[56] References Cited

U.S. PATENT DOCUMENTS

| 3,352,611 | 11/1967 | Seidel | 308/189 R |
| 3,411,706 | 11/1968 | Woollenweber, Jr. et al. | 308/35 X |
| 3,428,374 | 2/1969 | Orkin et al. | 308/240 X |
| 3,708,215 | 1/1973 | Wilcock et al. | 308/35 |
| 4,017,128 | 4/1977 | Setele et al. | 308/184 R X |

Primary Examiner—Trygve M. Blix
Assistant Examiner—Douglas C. Butler
Attorney, Agent, or Firm—Burns, Doane, Swecker & Mathis

[57] ABSTRACT

A dual bearing structure for supporting the rotor shaft of a rotatable machine such as a turbocharger includes antifriction bearings of the inclined contact ball type which accommodate radial forces and also axial forces acting in one direction on the shaft and a plain thrust bearing located adjacent the antifriction bearings which accommodates axial forces acting in the opposite direction. The fixed ring of the thrust bearing includes radial oil guide slots and lubricating oil for the bearings admitted into the bearing housing forms a rotatable ring of oil which owing to the action of centrifugal force passes from the antifriction bearing into the oil guide slots in the fixed ring of the thrust bearing.

10 Claims, 3 Drawing Figures

DUAL BEARING STRUCTURE FOR ROTATABLE MACHINE PARTS WITH ANTIFRICTION AND PLAIN BEARINGS

BACKGROUND OF THE INVENTION

The present invention relates to an improvement in a bearing for rotatable shafts, in particular in turbochargers, comprising antifriction bearings located between shaft and casing to accommodate radial forces and axial forces acting in one direction on the shaft, and a plain bearing to accommodate axial forces acting on the shaft in the opposite direction, and a lubricating-oil supply system.

In thermal turbomachines, as also in turbochargers, large axial forces can occur which, if antifriction bearings are used in view of friction loss and performance under conditions of insufficient lubricant, are best accommodated by angular, i.e., inclined contact ball bearings or tapered roller bearings. Normally, the axial force always acts in the same direction, but relatively small negative forces can arise under certain operating circumstances, especially when turbochargers are operated intermittently. It two inclined contact ball bearings are arranged in a turbocharger in an "X configuration" with respect to each other, the negative forces can be accommodated by the rear bearing. If very high positive axial forces occur, both inclined contact bearings are mounted in tandem arrangement and act in the same direction. In this case there is scarcely room in most turbochargers for a third bearing arranged the other way round, and if such a bearing were to be fitted, the oil supply and the dissipation of heat would present serious difficulties.

In known turbochargers, four-point bearings are often used instead of inclined contact bearings, as these can accommodate both positive and negative axial forces. However, difficulties are encountered in manufacturing and fitting such four-point bearings in turbochargers with small axial clearances and high operating temperatures, since with this configuration there is a tendency for the bearing to seize under certain circumstances. Furthermore, extremely high accuracy of manufacture is required and an asymmetrical construction is necessary in order to keep the bearing loss as low as with inclined contact bearings and to facilitate the flow of oil through the bearing. The design is therefore considerably more complex and costly.

Various combinations of antifriction bearings and plain bearings have also been employed. These are then arranged so that the load or the speed is distributed between the two types of bearing.

SUMMARY OF THE INVENTION

The principal objective of the invention is to create a bearing which can accommodate small pulsating negative axial forces and with which reliable lubrication of the entire bearing ca be attained.

This objective is achieved in that oil inlet ports are provided for lubricating the antifriction bearings and the fixed ring of the plain thrust bearing incorporates oil guide slots, and that the lubricating oil present in the antifriction bearings forms a rotating ring of oil which owing to centrifugal force passes into oil guide slots in the fixed ring, and further that there is an axial clearance between the antifriction bearing and the plain bearing.

In a preferred form of the invention the fixed ring of the thrust bearing incorporates essentially radial oil guide slots and the oil inlet ports of the radial oil drainage channels are located outside the mean diameter of the antifriction bearings.

The advantage of the configuration of the invention lies in particular in the fact that the additional plain thrust bearing can be fitted without major structural modifications to the bearing section of the turbocharger, i.e., to the existing inclined contact ball bearings, and that overloading of the plain bearing and the antifriction bearing is avoided by means of an axial clearance which is variable within predetermined limits. Also, efficient drainage of the oil after the bearing points is assured in a simple manner by the provision of essentially radial oil drainage channels with oil guide slots. An arrangement of this king gives rise to a rotating ring of oil the inner diameter of which is relatively large, the effect of this being to reduce the churning loss caused by the balls in the inclined contact bearings.

It is of particular advantage if the contact surfaces of the plain thrust bearing are of a self-lubricating material.

The choice of such a material for the contact surfaces of the plain thrust bearing will be appropriate in all instances where there is little or no lubricating oil present on starting the turbomachine, in particular a turbocharger. The properties of a self-lubricating material will prevent seizure of the bearing surfaces under such conditions.

BRIEF DESCRIPTION OF DRAWINGS

Two embodiments of the invention are illustrated in simplified form in the accompanying drawings, in which.

DETAILED DESCRIPTION OF PREFERRED EMBODIMENTS

Figure 1:
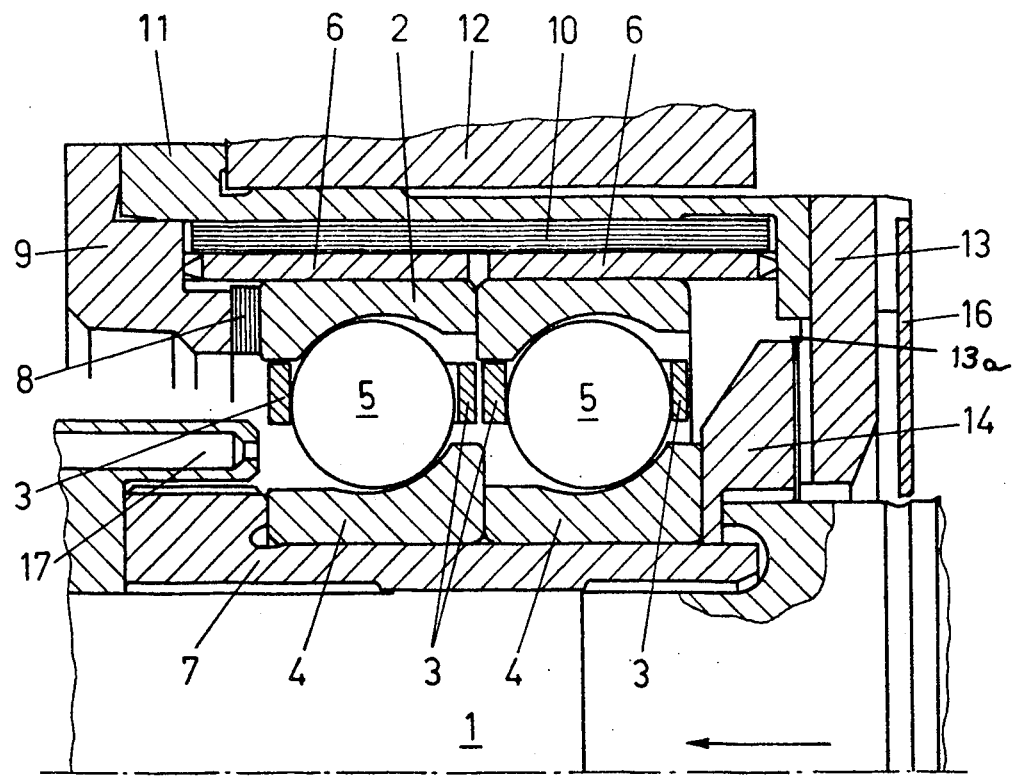
FIG. 1 shows a longitudinal half-section through a bearing at the compressor end of a turbocharger.

FIG. 1 shows a shaft 1, for example, of a turbocharger, on which two inclined contact ball bearings, each comprising an outer ring 2, a cage 3, an inner ring 4 and balls 5, are mounted to act in the same direction and accommodate the positive axial forces, the direction of which is indicated by the arrow. The two inclined contact ball bearings are provided with outer bushes 6 and a common inner bush 7 and are supported by way of axial damper plates 10 on a bearing flange 11. The inclined contact ball bearings comprising the parts listed above are slipped over the shaft 1 as a complete assembly, and fixed to a bearing housing 12. Also fixed to the bearing flange 11 after the ball bearing is a plain thrust bearing comprising a fixed thrust ring 13 and a rotatable thrust ring 14. The fixed ring 13 has a contact surface divided into segments by a number of radial oil drain channels 13a of large cross-section which can contain all the oil passing through the bearing assembly. Only one of the channels 13a is illustrated in FIG. 1. These bearing segments can be flat or slightly inclined in the circumferential direction. Since the bearing segments are continually in contact with hot oil they are made from a temperature-resistant bearing material which has good dry-running properties, these being particularly necessary if there is only a little, or no, oil present during starting. The thrust ring 14 can be fixed on the shaft 1 by clamping with the inner ring 4 or an adapter ring, by press-fitting or by any other established method. It is also possible for the inner ring 4 itself to constitute the thrust ring. In this case, the ring 4 would also function as a thrust ring. This is feasible if the inner bearing ring 4 is shaped in a suitable manner with the additional thrust ring 14 then being superfluous.

Figure 2:
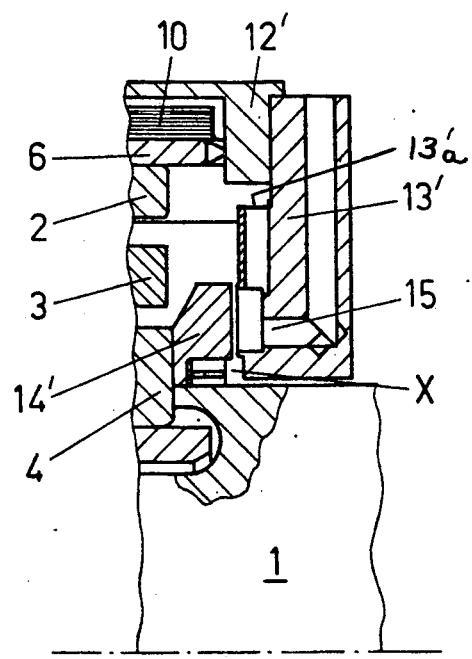
FIG. 2 shows an alternative method of draining lubricant from the bearing of FIG. 1.

An alternative form of the rotatable thrust ring 14 is shown in FIG. 2, the ring 14 in this case having a smaller outside diameter than in FIG. 1. Between the rotatable thrust ring 14 and the fixed ring 13 there is an oil drain channel 13a through which the oil after the inclined contact ball bearings can be led away through an oil line 15 to the outside.

Figure 3:
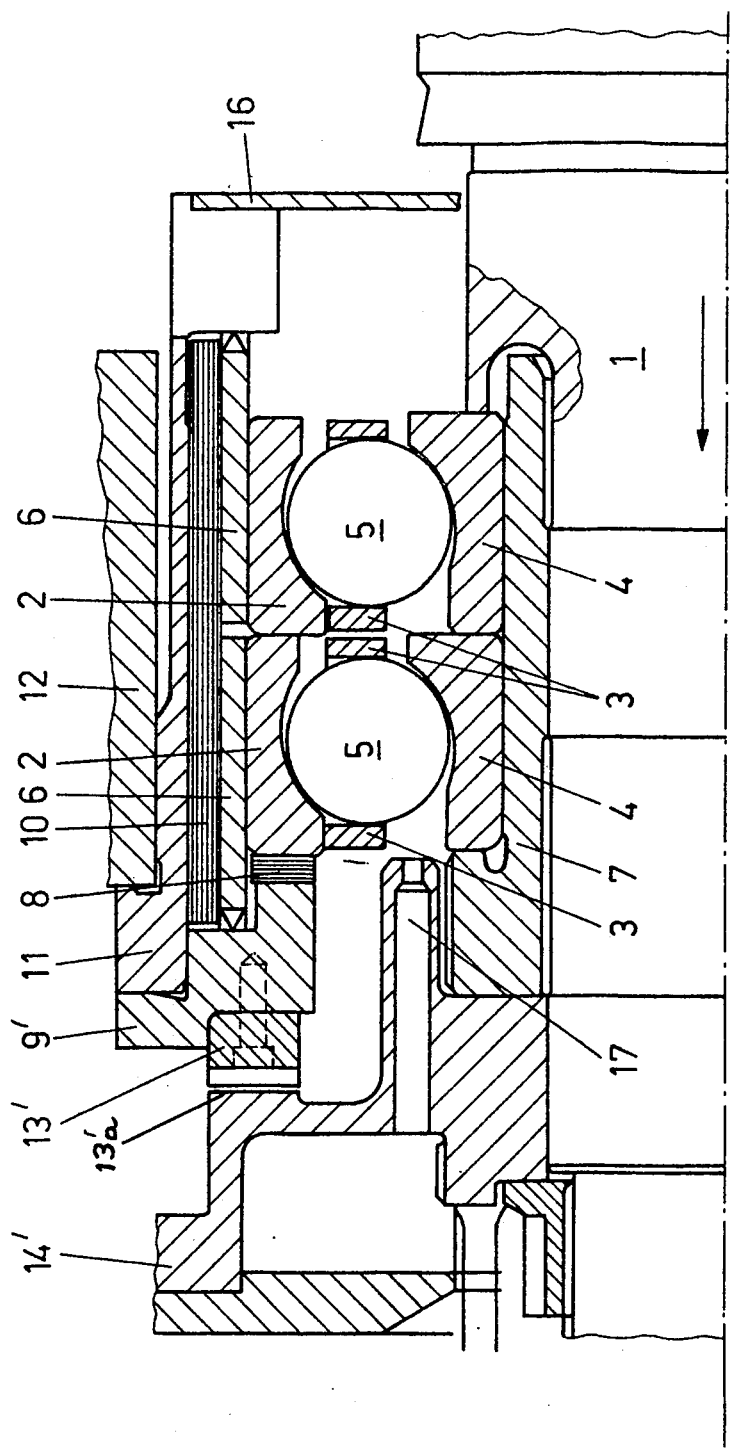
FIG. 3 is a longitudinal half-section through a bearing of a turbocharger with the plain thrust bearing ahead of the ball bearings, i.e., a reversal of the postion shown in FIG. 1.

FIG. 3 shows another form of a bearing assembly, the fixed thrust bearing ring 13 with a plurality of oil drain channels 13a in this case being located before the ball bearings provided to accommodate the positive axial forces (indicated by the direction of the arrow), while the rotatable thrust ring 14 forms part of the oil centrifuge. In this configuration the inside diameter of the fixed ring 13 is approximately equal to the outer ball track of the inclined contact bearing, the purpose of this being not to impede the discharge of oil from the bearings. In both versions (FIG. 1 and FIG. 3), the bearings are sealed from the outside by an oil wiper plate 16. The thrust ring 14 with its oil inlet port 17 located at the end nearer to the shaft 1 simultaneously serves as an oil centrifuge. Lubricating oil can pass through the ports 17 into the bearing. Only one of the ports 17 is illustrated in FIGS. 1 and 3. It is also possible to have the thrust ring 14 and an oil centrifuge as separate parts, but fitted together in order to act as one part.

The arrangement of the invention functions in the following manner:

The rotatable thrust ring 14 shown in FIG. 1 has a diameter approximately equal to the diameter of the outer race of the bearing balls 5. The radial oil drainage channels commence outside this diameter, the effect of this being that the diameter of the oil ring created by centrifugal force in the ball bearings is not smaller than a certain value so that the churning loss caused by the balls remains small. The thrust ring 14 shown in FIG. 2 has a smaller diameter, thus necessitating the provision of oil drainage channels 13a. This arrangement is recommended in all instances where small negative forces act on the bearing assembly. Also, a rotating ring of sealing oil forms at position X, the purpose of which is to avoid harmful wetting of the shaft 1 by escaping oil. The oil gap formed between the rotatable thrust ring 14 and the fixed thrust ring 13 remains as parallel as possible to the surfaces of the two rings of the bearing, even under load. By supporting the thrust ring 14 on the inside and fixing the fixed ring 13 on the outside, and by giving both components the appropriate stiffness, the two parts when under load are caused to deform conically and elastically relative to each other, and by equal amounts.

The effect of the arrangement shown in FIG. 3 is that the plain bearing has a greater load-bearing capacity, as it is in contact with cooler oil.

The bearing configurations of the invention as described above provide a simple method of compensating the negative axial forces acting on the bearings, and thus of relieving the inclined contact ball bearings from these forces, the axial clearance between the fixed thrust ring 13 and the rotatable thrust ring 14 being so chosen that the bearing surfaces touch only when the positive axial force approaches zero. However, the axial clearance must be adjusted so that harmful operating conditions do not arise in the inclined contact ball bearings when negative thrust forces occur.

We claim:

1. A dual bearing structure for a rotatable shaft of a machine such as a turbocharger and the like, comprising:

antifriction bearing means for accommodating axial forces acting only in one direction of the shaft and radial forces, the antifriction bearing means being located between the shaft and a bearing housing;

plain thrust bearing means for accommodating axial forces acting only in a direction opposite to the direction of the axial forces accommodated by the antifriction bearing means the plain thrust bearing means being located adjacent to the antifriction bearing means but having an axial clearance therebetween;

lubricating oil supply means for supplying oil to the antifriction bearing means and to the plain thrust bearing means; and at least one oil drain channel extending radially of the shaft and having an inlet provided at a radial distance from the shaft which is at least at an outer diameter of the antifriction bearing means, the location of the inlet of the at least one oil drain channel causing a rotating ring of lubricating oil to form at an outer periphery of the antifriction bearing means as a result of centrifugal force during a rotation of the shaft.

2. The dual bearing structure of claim 1 wherein the plain thrust bearing means includes
   a fixed thrust ring,
   a rotatable thrust ring mounted on the shaft, and
   at least one oil guide slot provided between the fixed and rotatable thrust rings.

3. The dual bearing structure of claim 2 wherein the at least one oil guide slot extends radially of the shaft and has an inlet located at least at an outer diameter of the antifriction bearing means.

4. The dual bearing structure of claim 2 wherein contact surfaces of the fixed and rotatable rings of the plain thrust bearing are of a self-lubricating material.

5. The dual bearing structure of claim 1 wherein the antifriction bearing means includes an antifriction bearing of the inclined contact ball type.

6. The dual bearing structure of claim 1 wherein the antifriction bearing means includes two antifriction bearings of the inclined contact ball type located in a side-by-side relationship.

7. The dual bearing structure of claim 1 wherein the at least one oil drain channel extends radially inwardly of the shaft.

8. The dual bearing structure of claim 7 wherein the lubricating oil supply means supplys oil directly to the antifriction bearing means, the oil flowing through the antifriction bearing means to the plain thrust bearing means.

9. The dual bearing structure of claim 1 wherein the at least one oil drain channel extends radially outwardly of the shaft.

10. The dual bearing structure of claim 9 wherein the lubricating oil supply means supplys oil directly to both the antifriction bearing means and to the plain thrust bearing means.

* * * * *